United States Patent [19]

de Haas et al.

[11] Patent Number: 4,801,245

[45] Date of Patent: Jan. 31, 1989

[54] METHOD OF DAMPING SURGES IN RECIRPOCATING COMPRESSORS

[75] Inventors: Peter de Haas; Robert Ehrich; Reidar Joergensen, all of Berlin, Fed. Rep. of Germany

[73] Assignee: Borsig GmbH, Berlin, Fed. Rep. of Germany

[21] Appl. No.: 183,259

[22] Filed: Apr. 8, 1988

Related U.S. Application Data

[63] Continuation of Ser. No. 44,886, May 1, 1987, abandoned.

[30] Foreign Application Priority Data

May 2, 1986 [DE] Fed. Rep. of Germany ....... 3614930

[51] Int. Cl.$^4$ ............................................. F04B 11/00
[52] U.S. Cl. ..................................... 417/53; 417/441; 417/540; 60/459
[58] Field of Search ................. 417/53, 279, 300, 440, 417/441, 540; 137/481.5; 251/117; 60/459; 138/45, 46; 73/707, 861.62, 861.53

[56] References Cited

U.S. PATENT DOCUMENTS

| 17,726 | 6/1857 | Clark | 417/540 |
|---|---|---|---|
| 1,946,319 | 2/1934 | Hodgson et al. | 73/861.62 |
| 3,027,902 | 4/1962 | Herr | 60/459 X |
| 3,635,021 | 1/1972 | McMillen et al. | 417/222 X |
| 4,430,049 | 2/1984 | Aiba | 417/540 |
| 4,558,994 | 12/1985 | Viola et al. | 417/295 |
| 4,632,358 | 12/1986 | Orth et al. | 251/117 |

FOREIGN PATENT DOCUMENTS

| 0429784 | 5/1911 | France | 60/459 |
|---|---|---|---|
| 2026704 | 2/1980 | United Kingdom | 73/861.62 |

Primary Examiner—Carlton R. Croyle
Assistant Examiner—Eugene L. Szczecina, Jr.
Attorney, Agent, or Firm—Max Fogiel

[57] ABSTRACT

One or more throttles are accommodated in a compression line and/or in a suction line to damp surges in reciprocating compressors. The size of the open cross-section of the throttle can be varied. The size is established to prevent surges from exceeding a prescribed limit.

9 Claims, 2 Drawing Sheets

METHOD OF DAMPING SURGES IN RECIRPOCATING COMPRESSORS

This is a continuation of Ser. No. 07/044,886 filed May 1, 1987, now abandoned.

BACKGROUND OF THE INVENTION

The invention concerns a method of damping surges in reciprocating compressors.

The use of buffers to protect pipelines from the surges (fluctuations in pressure resulting from pulsed conveyance) generated by reciprocating compressors are known. Buffers are large containers positioned as close to the compressor's cylinder as possible. Unavoidable fluctuations in pressure due to resonance are damped by throttles in the suction and/or compression lines. The effect of the throttle derives from its creation of a drop in pressure, and the extent of the drop depends on how fast the medium being conveyed is flowing. If the compressor's throughput is decreased, damping will be less effective due to the lower flow rate. The open cross-section of the throttle must in that case be appropriate for lower loads, which constitute a range of particular threat to the system. The consequence, however, is that the pressure drop at full load will be much more extensive than necessary, to the detriment of efficiency.

SUMMARY OF THE INVENTION

The object of the invention is to damp reciprocating-compressor surges to the extent that they will not exceed a prescribed level while keeping the pressure drop as slight as possible.

Varying the open cross-section of the throttle makes it possible to adapt the effect of the damping to prevailing conditions. The extent of damping can accordingly be optimally established, and the pressure drops deriving from the decrease in cross-section will not exceed the precisely necessary level.

Preferred embodiments of the invention will hereinafter be described with reference to the appended drawings. It is to be understood, however, that these are merely by way of example and that the scope of the protection sought for the invention is defined exclusively in the claims.

DESCRIPTION OF THE PREFERRED EMBODIMENTS

Figure 1:
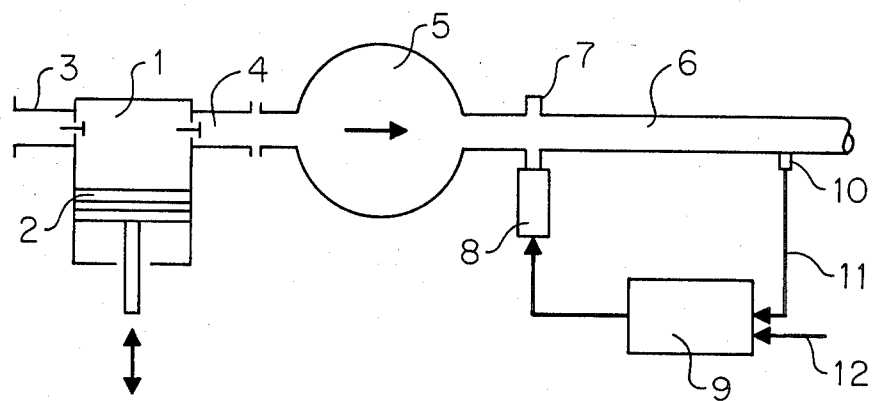
FIGS. 1 and 2 are schematic drawings of a device for carrying out the invention.

The cylinder 1 of a reciprocating compressor accommodates an axially movable piston 2. Cylinder 1 is provided with an intake 3 from a suction line and with an outlet 4. Outlet 4 communicates with a buffer 5. A compression line 6 is flanged to buffer 5.

Downstream of buffer 5 there is a throttle 7 in compression line 6. It would also be conceivable to position throttle 7 on the suction side of the compressor. Several throttles could also be employed instead of one. The size of the open cross-section of throttle 7 can be varied by means of an actuator 8.

The actuator 8 illustrated in FIG. 1 is connected to controls 9. There is a pressure sensor 10 in compression line 6 downstream of throttle 7. An instrument lead 11 extends from pressure sensor 10 to controls 9. A limit 12 that specifies the currently permissible fluctuation in pressure is entered in controls 9. The results from pressure sensor 10 are compared with the previously entered limit 12 in controls 9. If the detected pressure fluctuation exceeds the prescribed limit, controls 9 instruct actuator 8 to reduce the open cross-section of throttle 7 until the limit is no longer exceeded. If the detected fluctuation is lower, the size of the cross-section is increased until the flucation just fails to exceed the limit.

Figure 2:
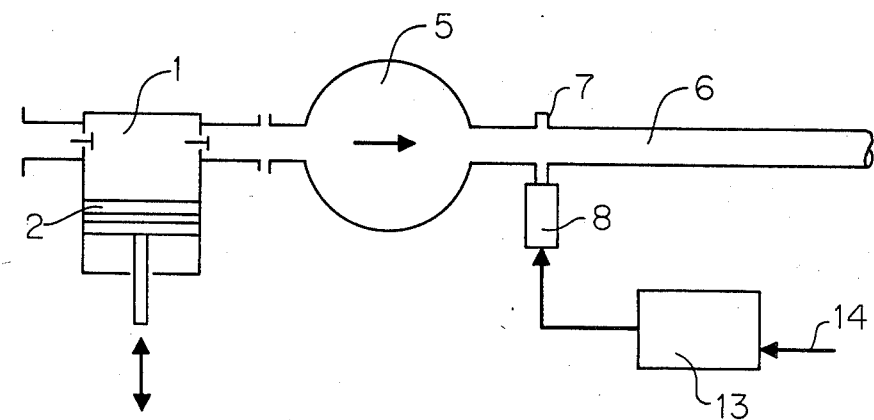

The fluctation in pressure is not measured in the embodiment illustrated in FIG. 2. Controls 13 are directly supplied by the compressor with a signal 14 representing the prescribed flow rate. Actuator 8 then varies the size of the open cross-section of throttle 7 in accordance with signal 14 on the basis of a function entered in controls 13.

Figure 3:
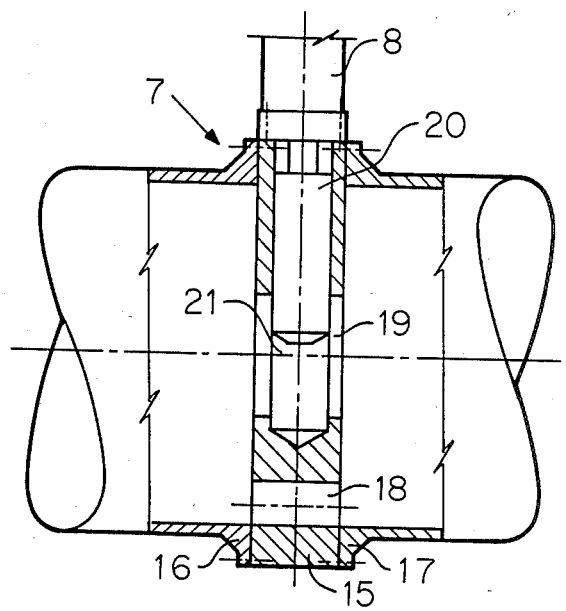
FIG. 3 is a longitudinal section through a device for carrying out the invention.
Figure 4:
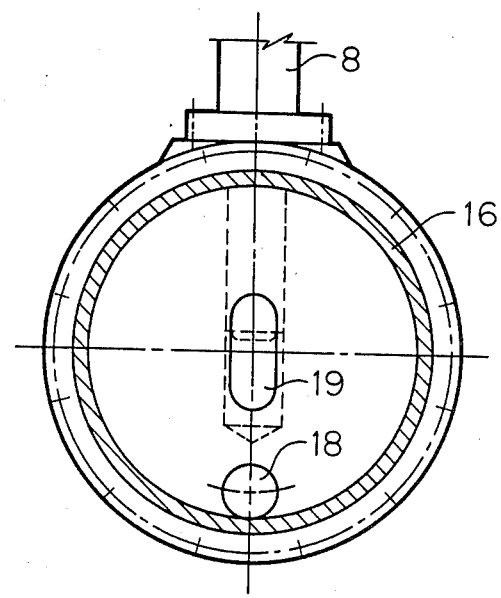
FIG. 4 is a side view of the device illustrated in FIG. 3.

The throttle 7 illustrated in FIGS. 3 and 4 consists of a disk 15 screwed in between the flange 16 on buffer 5 and the flange 17 on pressure line 6. Disk 15 has two axial openings 18 and 19. The size of opening 18 is constant, and the opening is large enough to protect both cylinder 1 and pressure line 6 from the pressure backup that occurs at maximum flow. Opening 18 accordingly functions as a safety device in the event of breakdown on the part of the controls.

The size of opening 19 can be varied by means of a pin 20 accommodated in a radial bore 21 in disk 15 and extending through the opening. Pin 20 is engaged by actuator 8, which is indicated only schematically in FIGS. 3 and 4. Actuators of this type, which operate mechanically, pneumatically, hydraulically, or electrically, are in themselves known and accordingly need not be specified.

The invention has been described herein with reference to exemplary embodiments. It will be understood, however, that it is receptable of various modifications, which will offer themselves to those skilled in the art and which are intended to be encompassed within the protection sought for the invention as set forth in the appended claims.

We claim:

1. A method of damping pressure oscillations in reciprocating compressors comprising the steps of: providing at least one throttle with adjustable flow-through opening in a line of a compressor; measuring pressure fluctuations in said line having said throttle; said fluctuations being superimposed on a working pressure produced by said compressor comparing the measured pressure fluctuations with a predetermined limit; and reducing said flow-through opening of the throttle when said predetermined limit is exceeded, said flow-through opening of said throttle being reduced to a predetermined minimum at which said fluctuations are tolerable; said throttle being continuously adjustable for damping resonance amplified fluctuations; when said predetermined limit is not attained, said flow-through opening of the throttle is increased until said limit is just about to be exceeded, said flow-through opening being adapted to the measured pressure fluctuations up to a constant minimum magnitude of said opening.

2. A method as defined in claim 1, wherein damping of said pressure oscillations occurs from pressure losses produced in said line, said pressure losses being set to a value so that said pressure oscillations are damped to a tolerable level.

3. A method as defined in claim 1, wherein, when said predetermined limit is not attained, said flow-through opening of the throttle is increwased until said limit is just about to be exceeded.

4. A method as defined in claim 1, wherein said flow-through opening is adapted to the measured pressure fluctuations up to a constant minimum magnitude of said opening.

5. A method as defined in claim 3, wherein said flow-through opening is adapted to said operating conditions up to a constant minimum magnitude of said opening.

6. A method as defined in claim 4, wherein said flow-through opening is adapted to said processing parameters up to a constant minimum magnitude of said opening.

7. A method as defined in claim 1, wherein said throttle comprises a disk with two axial openings, one of said axial openings having a constant size and being large enough to protect said compressor and said line from pressure backup occurring at maximum flow, the other one of said axial opening having a variable size adjustable by a pin in a radial bore in said disk and extending through said other opening, said pin being engaged by an actuator.

8. A method of damping pressure fluctuations in reciprocating compressors comprising the steps of: providing at least one throttle with adjustable flow-through opening in a line of a compressor; adjusting said flow-through opening of the throttle in relation to operating conditions of the compressor to prevent pressure fluctuations from exceeding a predetermined limit, said fluctuations being superimposed on a working pressure produced by said compressor, said flow-through opening of said throttle being reduced to a predetermined minimum at which said fluctuations are tolerable and pressure drop across said throttle is below a predetermined level; said throttle being continuously adjustable for damping resonance amplified fluctuations.

9. A method of damping pressure fluctuations in reciprocating compressors comprising the steps of: providing at least one throttle with adjustable flow-through opening in a line of a compressor; adjusting said flow-through opening of the throttle in relation to processing parameters to prevent pressure fluctuations from exceeding a predetermined limit, said fluctuations being superimposed on a working pressure produced by said compressor, said flow-through opening of said throttle being reduced to a predetermined minimum at which said fluctuations are tolerable and pressure drop across said throttle is below a predetermined level; said throttle being continuously adjustable for damping resonance amplified fluctuations.

* * * * *